United States Patent
Putra et al.

(10) Patent No.: US 12,291,214 B2
(45) Date of Patent: May 6, 2025

(54) METHOD FOR DETERMINING THE PAYLOAD MASS OF A VEHICLE

(71) Applicant: Robert Bosch GmbH, Stuttgart (DE)

(72) Inventors: Lingga Aksara Putra, Straubing (DE); Philipp Birkholz, Obersulm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 238 days.

(21) Appl. No.: 17/894,251

(22) Filed: Aug. 24, 2022

(65) Prior Publication Data

US 2023/0113559 A1 Apr. 13, 2023

(30) Foreign Application Priority Data

Oct. 11, 2021 (DE) ...................... 10 2021 211 439.3

(51) Int. Cl.
*B60W 40/13* (2012.01)
*B60W 50/00* (2006.01)
*G01G 19/08* (2006.01)

(52) U.S. Cl.
CPC ........ *B60W 40/13* (2013.01); *B60W 50/0097* (2013.01); *G01G 19/08* (2013.01); *B60W 2050/0031* (2013.01); *B60W 2510/22* (2013.01); *B60W 2530/10* (2013.01); *B60W 2710/18* (2013.01); *B60W 2720/106* (2013.01)

(58) Field of Classification Search
None
See application file for complete search history.

(56) References Cited

U.S. PATENT DOCUMENTS

2008/0275603 A1* 11/2008 Krober ............... B60G 17/0162
701/31.4

FOREIGN PATENT DOCUMENTS

| DE | 102005014569 A1 * | 10/2006 | ............ B60W 40/13 |
| DE | 102016015268 A1 * | 6/2018 | ............ B60T 8/172 |
| EP | 1863659 B1 | 5/2009 | |
| WO | WO-2006102993 A2 * | 10/2006 | ............ B60W 40/13 |
| WO | WO-2019081180 A1 * | 5/2019 | ............ B60L 11/12 |

OTHER PUBLICATIONS

English translation of DE-102005014569-A1 (Year: 2024).*
English translation of WO-2019081180-A1 (Year: 2024).*
(Continued)

*Primary Examiner* — Amelia Vorce
(74) *Attorney, Agent, or Firm* — NORTON ROSE FULBRIGHT US LLP

(57) ABSTRACT

A method for determining the payload mass resting on a wheel of a vehicle is disclosed. The method involves using a level sensor system, in a time period in which the vehicle is moved, a time series of measured values is detected, which each indicate the vertical position of the vehicle body in relation to the wheel. In the method, a model is provided for the temporal development of the vertical position under the influence of the gravitational force of vehicle body and payload, an elastic suspension between the vehicle body and the wheel of the vehicle, and a damping of the vertical relative movement between the vehicle body and the wheel of the vehicle. The model is parameterized at least using the sought payload mass. The wheel of the vehicle and the connection of the wheel to the roadway are assumed to be rigid.

13 Claims, 6 Drawing Sheets

(56) References Cited

OTHER PUBLICATIONS

Jordan et al., "Vehicle Mass Estimation Based on Vehicle Vertical Dynamics Using a Multi-Model Filter", 2014 IEEE 17th International Conference on Intelligent Transportation Systems (ITSC) Oct. 8-11, 2014. Qingdao, China (Year: 2014).*

"Numerical differentiation: finite differences", Brown University, APMA0160 (A.Yew) Spring 2011 (Year: 2011).*

* cited by examiner

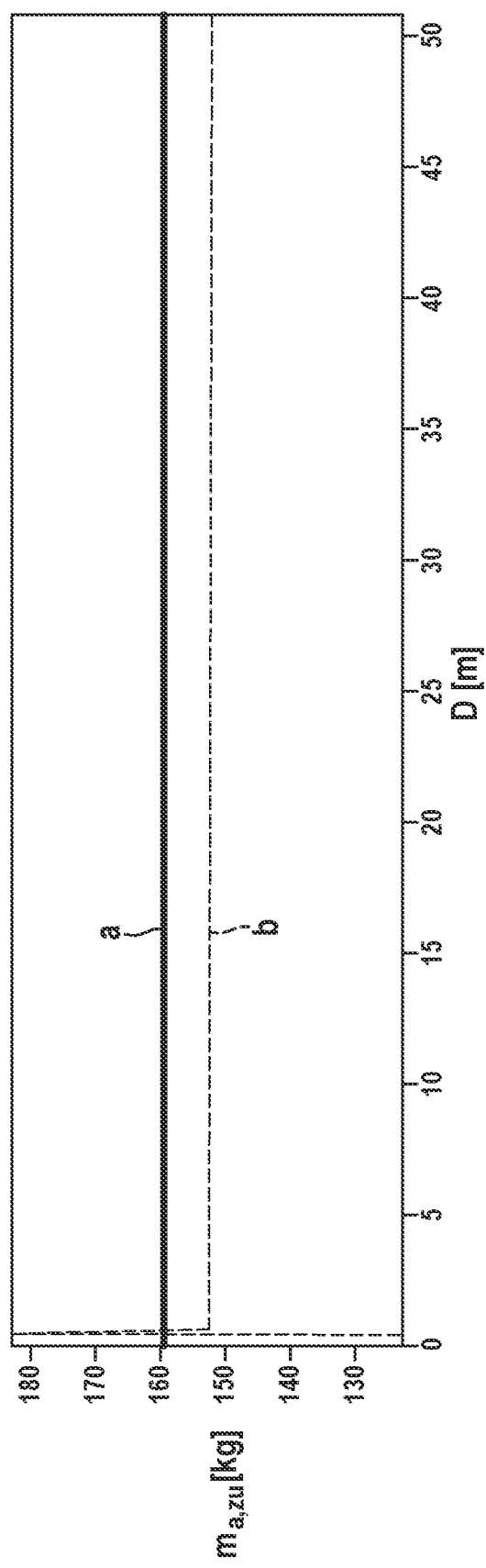

METHOD FOR DETERMINING THE PAYLOAD MASS OF A VEHICLE

CROSS REFERENCE

The present application claims the benefit under 35 U.S.C. § 119 of German Patent Application No. DE 10 2021 211 439.3 filed on Oct. 11, 2021, which is expressly incorporated herein by reference in its entirety.

FIELD

The present invention relates to the determination of the payload mass of a vehicle on the basis of sensor data which are supplied by a level sensor system of the vehicle.

BACKGROUND INFORMATION

Many functions of driver assistance systems or systems for at least semiautomated driving have to activate the particular vehicle in such a way that it experiences a defined acceleration. Thus, for example, when merging onto an expressway it is important to accurately maintain a trajectory planned in consideration of other vehicles in the right lane and to reach the velocity required for the merging into the acceleration lane at the correct time. In automated parking processes, it is important in particular to bring the vehicle to a standstill accurately at specific points in order not to drive into other vehicles beyond the parking space.

The force required for a longitudinal acceleration of the vehicle, which is to be applied to the wheels in the form of a torque, is proportional to this longitudinal acceleration and to the vehicle mass. The vehicle mass may vary in broad limits, depending on the type of vehicle, between the minimal mass in the roadworthy state and the maximum permissible total mass. Thus, for example, a delivery truck may add a load in the order of magnitude of 50% of its empty mass. If this is not taken into consideration and the delivery truck is unloaded after the parking, it makes an unexpected jerk forward during the subsequent unparking.

European Patent No. EP 1 863 659 B1 describes a method, using which the mass of the vehicle may be ascertained on the basis of vertical movements of the vehicle body from sensor data of a level sensor system of the vehicle.

SUMMARY

Within the scope of the present invention, a method for determining payload mass $m_{a,zu}$ resting on a wheel of a vehicle is provided. According to an example embodiment of the present invention, this method presumes that the vehicle has a level sensor system, which is capable of detecting a vertical movement of the vehicle body in relation to the wheel. In this context, for example, arrangements of double tires in trucks which support the same point of the vehicle body are also to be viewed as one wheel. The total payload mass of the vehicle may be ascertained as the sum of payload mass $m_{a,zu}$ ascertained in each case for all wheels of the vehicle or may be ascertained in approximation by multiplication of $m_{a,zu}$ by the number of wheels of the vehicle.

Within the scope of the method of the present invention, a time series of measured values, which each indicate vertical position $z_a-z_r$ of the vehicle body in relation to the wheel, is detected using the level sensor system in a time period in which the vehicle is moved.

A model is provided for the temporal development of this vertical position $z_a-z_r$ under the influence of the gravitational force of vehicle body and payload, an elastic suspension between the vehicle body and the wheel of the vehicle, and a damping of the vertical relative movement between the vehicle body and the wheel of the vehicle. This model is parameterized at least using the sought payload mass $m_{a,zu}$. Furthermore, the wheel of the vehicle and the connection of the wheel to the roadway are assumed to be rigid in the model. That is to say, the wheel and its connection to the roadway do not contribute to the vertical dynamics of the vehicle body with an additional spring constant or with an additional damping.

A payload mass $m_{a,zu}^*$, which brings the model optimally into accordance with the time series of measured values, is ascertained as the sought payload mass $m_{a,zu}$. Various approaches are possible for finding this payload mass $m_{a,zu}^*$.

For example, various candidate values for the payload mass may be used in the model, and it may then be tested for which of these candidate values the time profile of vertical position $z_a-z_r$ supplied by the model corresponds best to the previously detected time series of measured values. This candidate value may then be classified as optimum payload mass $m_{a,zu}^*$.

Vice versa, however, one or multiple conditions may also be ascertained from the model in conjunction with the detected time series of measured values, which optimum payload mass $m_{a,zu}^*$ has to meet to be consistent with the model and the time series of measured values. That payload mass $m_{a,zu}^*$ may then be ascertained, for example, which on average best meets all stipulated conditions.

Independently of the way in which payload mass $m_{a,zu}^*$ is specifically ascertained, the simplification of the model to only one elastic suspension having a spring constant and only one damping having a damping constant is important. Like all simplifications, this simplification also always costs some accuracy. Without this simplification, however, it is necessary to measure the road profile navigated by the vehicle or to provide it in another way. If this road profile is not sufficiently well known, the loss of accuracy caused in this way may be greater than the loss of accuracy caused by the simplification to only one degree of freedom.

Of course, not exclusively a payload mass $m_{a,zu}$ but also a body mass $m_{a,l}$ rests on each wheel of the vehicle. This body mass $m_{a,l}$ is known, however. It is advantageous to parameterize the model using the sought payload mass $m_{a,zu}$ instead of using sum $m_{a,zu}+m_{a,l}$, because the model may then seamlessly take into consideration both the statics and also the dynamics of the vehicle.

According to an example embodiment of the present invention, the model particularly advantageously includes a balance of the forces acting on the vehicle body. A model for the statics and a model for the dynamics may then seamlessly merge into one another. For example, a differential equation may be prepared for vertical position $z_a-z_r$:

$$(m_{a,l}+m_{a,zu})\cdot\ddot{z}_a=-k_a(z_a-z_r)-d_a(\dot{z}_a-\dot{z}_r)-m_{a,zu}\cdot g$$

Herein, $k_a$ is the spring constant of the single elastic suspension, $d_a$ is the damping constant of the single damping, and g is the acceleration of gravity. In the stationary case, all temporal derivatives are set to zero, so that the following results:

$$k_a(z_a-z_r)=m_{a,zu}\cdot g.$$

This is the relationship between the spring force and known spring constants $k_a$. Using this relationship, payload mass $m_{a,zu}$ may be calculated in the stationary case while neglecting the noise. An incorrect calibration of the level sensor system has a direct effect on the final result, however. It is therefore advantageous to detect the time series of measured values in a time period in which the vehicle is moved, so that the dynamic component may also be taken into consideration outside the standstill.

The preparation of the model particularly advantageously includes the discretization of the temporal development in time steps having step width Δt. In this way, the temporal development of vertical position $z_a-z_r$ predicted by the model may be compared directly to the actual temporal development according to the detected time series of measured values, which is also provided in time-discrete form.

For example, a time derivative $\dot{z}$ of at least one state z in a time step k may be approximated by the differential quotient $$\dot{z} \approx \frac{z_{k+1} - z_k}{\Delta t}$$

from state change $z_{k+1}-z_k$ up to time step k+1 and step width Δt.

In one particularly advantageous embodiment of the present invention, ascertaining payload mass $m_{a,zu}*$, on the basis of the model, on the one hand, and the temporal development of vertical position $z_a-z_r$ between successive time steps k and k+1, on the other hand, includes preparing a system of differential equations in which payload mass $m_{a,zu}*$ is an unknown. Therefore, many conditions for payload mass $m_{a,zu}*$ may be derived from the detected time series of measured values. The solution of the system of equations then supplies that $m_{a,zu}*$ which best meets all stipulated conditions on average. It is generally not possible to completely meet all conditions without contradiction due to the noise.

In another particularly advantageous embodiment of the present invention, a model is selected which characterizes state $z=[z_1,z_2]^T$ of the vehicle body by way of vertical position $z_1=z_a-z_r$ and by its temporal derivative $z_2=\dot{z}_a-\dot{z}_r$. On the basis of the differential equation mentioned at the outset, such a model may be, for example, as $$\begin{bmatrix} z_{1,k+1} \\ z_{2,k+1} \end{bmatrix} = \begin{bmatrix} -\frac{k_a^1 \cdot \Delta t}{m_{a,l} + m_{a,zu}} & 1 - \frac{\frac{\Delta t}{d_a} \cdot \Delta t}{m_{a,l} + m_{a,zu}} \end{bmatrix} \cdot \begin{bmatrix} z_{1,k} \\ z_{2,k} \end{bmatrix} + \frac{m_{a,zu}^0 \cdot \Delta t}{m_{a,l} + m_{a,zu}} \cdot g$$

Acceleration of gravity g may be considered to be a constant input variable of this model. Output variable (or measured variable) y corresponds to vertical position $z_a-z_r$:

$$y = [1 \ 0] \cdot \begin{bmatrix} z_{1,k} \\ z_{2,k} \end{bmatrix}$$

Since input variable g is constant, the observability of this nonlinear system may be substantiated with the aid of lie derivatives. That means it is possible to infer, solely from input variable g and measured values for $z_{1,k}$, the parameters of the model (and here in particular $m_{a,zu}$) and complete state $z=[z_1,z_2]^T$ of the vehicle body. Therefore, state z and parameters of the model are advantageously ascertained using at least one nonlinear observation algorithm. This observation algorithm thus leads directly from the detected time series of measured values to sought payload mass $m_{a,zu}$. Strictly speaking, the results are the most probable values of the parameters, or of state z, in consideration of the given time series of $z_1=z_a-z_r$. The fundamental specific embodiments for an observer algorithm are the Extended Kalman Filter (EKF), the Unscented Kalman Filter (UKF), and the nonlinear Luenberger observer.

According to an example embodiment of the present invention, state z, or the parameters, are advantageously alternately predicted using the observation algorithm from temporally previous pieces of information and corrected on the basis of more recent pieces of information. This recursive approach is, on the one hand, particularly efficient, since the particular last estimation always contains all previous pieces of information and the computing work used on these previous pieces of information may therefore be reused. On the other hand, the calculation of state z, on the one hand, and the parameters (in particular $m_{a,zu}*$), on the other hand [sic], may advantageously be coupled, so that results may be exchanged between these calculations.

Such a coupling is advantageous because two qualitatively different types of variables (state and parameters) are to be ascertained, but only one measured input variable $z_1=z_a-z_r$ is available. The correction of the parameters is particularly advantageously carried out using the prediction of state z, and the prediction of state z is carried out using the prediction of the parameters. Each newly processed piece of information with respect to the one variable is thus directly advantageous in the processing of more recent information with respect to the other variable.

Particularly advantageously, according to an example embodiment of the present invention, state z is ascertained using an Unscented Kalman Filter (UKF), and the parameters are ascertained using an Extended Kalman Filter (EKF). Experiments have shown that EKF supplies a better estimation for the parameters (and in particular for $m_{a,zu}*$) while unknown state variable $z_2=\dot{z}_a-\dot{z}_r$ may be observed best using UKF. The combination of EKF and UKF may then be understood as a "Dual Extended Unscented Kalman Filter" (DEUKF).

In a further advantageous embodiment of the present invention, the model is adapted to the time series of the measured values by varying its parameters. Payload mass m_(a,zu)^* is ascertained from those parameters for which the model is most consistent with the time series of the measured values. In particular, for example, an already provided estimated value for payload mass m_(a,zu)^* may be further refined in this way, instead of the search for m_(a,zu)^* taking place unconditionally from the beginning.

Independently of the way in which an optimal payload mass $m_{a,zu}*$ with respect to the correspondence between model and measurement series is ascertained and classified as the sought payload mass $m_{a,zu}$ this finding may be used directly to control the vehicle dynamics of the vehicle. In a further particularly advantageous embodiment, ascertained payload mass $m_{a,zu}$ is used to meter a braking force and/or acceleration force of the vehicle in a movement regulation for a longitudinal movement of the vehicle. As explained at the outset, for example, the vehicle may then be merged more precisely via the acceleration lane into the flowing traffic on an expressway or parked more safely in tight parking spaces and unparked therefrom again.

The method may in particular be entirely or partially computer implemented. The present invention therefore also relates to a computer program including machine-readable instructions which, when they are executed on one or multiple computers, prompt the computer or computers to carry out the described method. Control units for vehicles and embedded systems for technical devices which are also capable of executing machine-readable instructions are also to be viewed as computers in this meaning.

The present invention also relates to a machine-readable data medium and/or a download product including the computer program. A download product is a digital product transferable via a data network, i.e., downloadable by a user of the data network, which may be sold, for example, in an online shop for immediate download.

Furthermore, a computer may be equipped with the computer program, the machine-readable data medium, or the download product.

Further measures improving the present invention are described in greater detail hereinafter together with the description of the preferred exemplary embodiments of the present invention on the basis of the figures.

BRIEF DESCRIPTION OF THE DRAWINGS

FIGS. 5A-5C show an observation of payload mass $m_{a,zu}$ and state z from measured values $z_a-z_r$ of a real trip on a level route.

DETAILED DESCRIPTION OF EXAMPLE EMBODIMENTS

Figure 1:
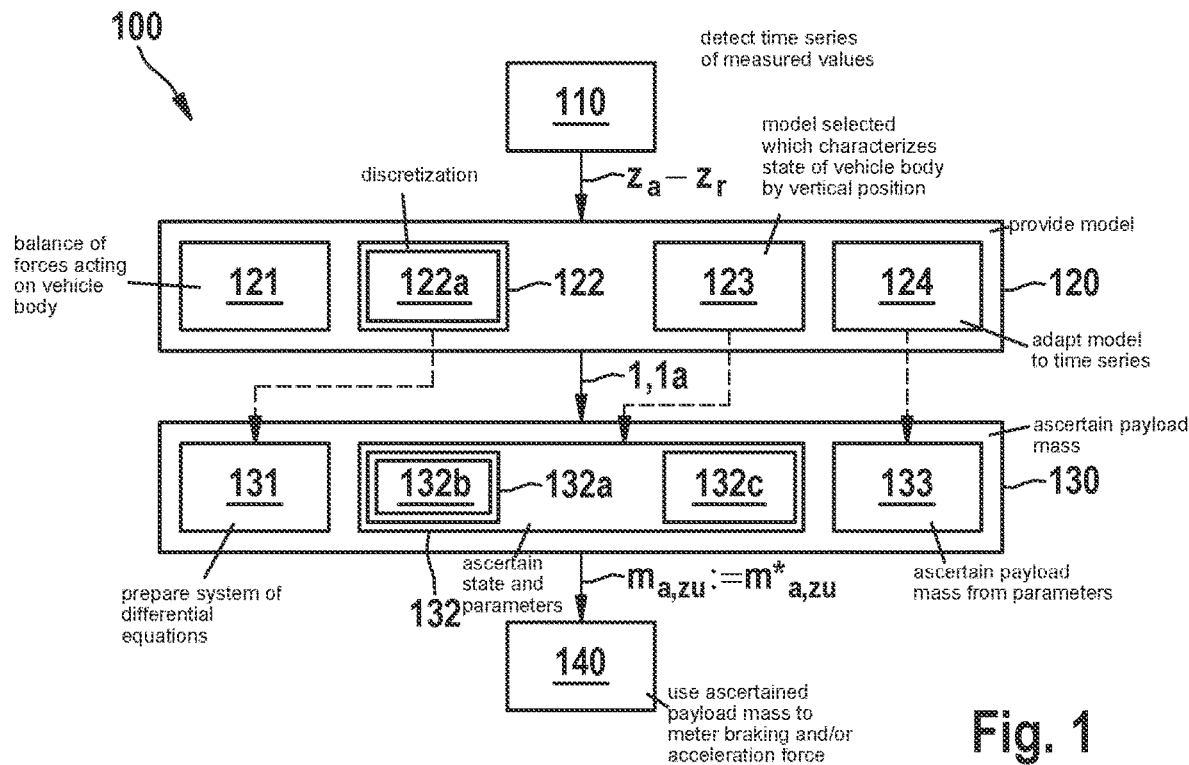
FIG. 1 shows an exemplary embodiment of method 100, according to the present invention.

FIG. 1 is a schematic flowchart of an exemplary embodiment of method 100 for determining payload mass $m_{a,zu}$ resting on a wheel of a vehicle.

In step 110, a time series of measured values, which each indicate vertical position $z_a-z_r$ of the vehicle body in relation to the wheel, is detected using the level sensor system of the vehicle in a time period in which the vehicle is moved.

In step 120, a model 1 for the temporal development of vertical position $z_a-z_r$ under the influence of the gravitational force of vehicle body and payload, an elastic suspension between the vehicle body and the wheel of the vehicle, and a damping of the vertical relative movement between the vehicle body and the wheel of the vehicle is provided. This model 1 is parameterized at least using the sought payload mass $m_{a,zu}$ and assumes the wheel of the vehicle and the connection of the wheel to the roadway as rigid. Model 1 may additionally also be parameterized using arbitrary further parameters 1a.

In step 130, a payload mass $m_{a,zu}^*$, which brings model 1 optimally into accordance with the time series of measured values, is ascertained as the sought payload mass $m_{a,zu}$.

In step 140, ascertained payload mass $m_{a,zu}$ is used to meter a braking force and/or acceleration force of the vehicle in a movement regulation for a longitudinal movement of the vehicle.

According to block 121, model 1 may include a balance of the forces acting on the vehicle body.

According to block 122, the preparation of model 1 may include the discretization of the temporal development in time steps having step width $\Delta t$. The ascertainment of payload mass $m_{a,zu}^*$ may then in particular include, according to block 131, preparing a system of differential equations on the basis of model 1, on the one hand, and the temporal development of vertical position $z_a-z_r$ between successive time steps k and k+1, on the other hand. In this system of differential equations, payload mass $m_{a,zu}^*$ is an unknown.

According to block 122a, a time derivative $\dot{z}$ of at least one state z in a time step k may be approximated by the differential quotient from state change $z_{k+1}-z_k$ up to time step k+1 and step width $\Delta t$.

According to block 123, a model 1 may be selected which characterizes state $z=[z_1,z_2]^T$ of the vehicle body by vertical position $z_1=z_a-z_r$ and by its temporal derivative $z_2=\dot{z}_a-\dot{z}_r$. State z and parameters 1a of model 1 may then be ascertained according to block 132 using at least one nonlinear observation algorithm.

In particular, according to block 132a, state z, or parameters 1a, may alternately be predicted from temporally previous pieces of information and corrected on the basis of more recent pieces of information using the observation algorithm. According to block 132b, the correction of parameters 1a may be carried out using the prediction of state z, and the prediction of state z may be carried out using the prediction of parameters 1a.

According to block 132c, state z may be ascertained using an Unscented Kalman Filter (UKF), and parameters 1a may be ascertained using an Extended Kalman Filter (EKF).

According to block 124, model 1 may be adapted to the time series of the measured values by varying its parameters 1a. According to block 133, payload mass $m_{a,zu}^*$ may be ascertained from those parameters 1a, for which model 1 is best consistent with the time series of the measured values.

Figure 2:
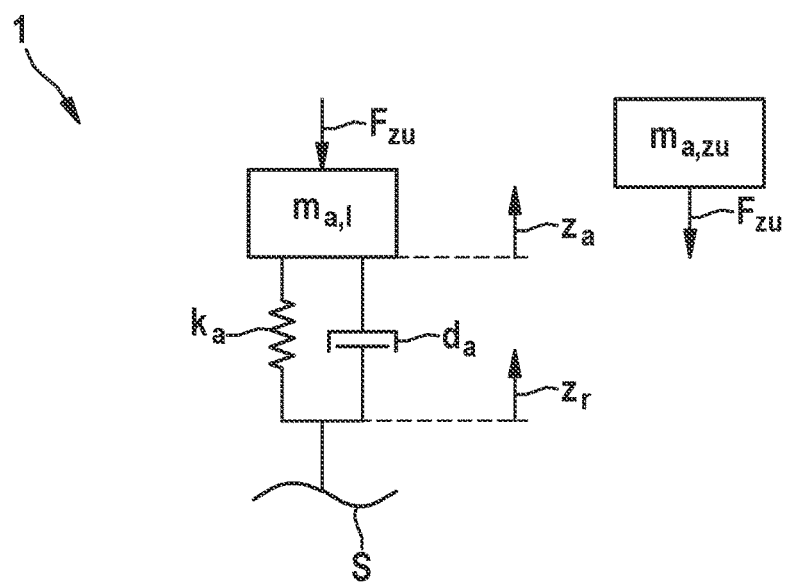
FIG. 2 shows an illustration of simplified dynamic model 1 including only one spring constant $k_a$ and damping constants $d_a$, according to an example embodiment of the present invention.

FIG. 2 illustrates simplified dynamic model 1. The vehicle body having mass $m_{a,l}$ is coupled to road S via an elastic suspension having spring constant $k_a$ and via a damping (such as a shock absorber) having damping constant $d_a$. The payload having mass $m_{a,zu}$ exerts a weight force $F_{zu}$ on the vehicle body.

The level sensor system measures vertical position $z_a-z_r$ of the vehicle body in relation to the wheel of the vehicle (not shown in FIG. 2).

Figure 3:
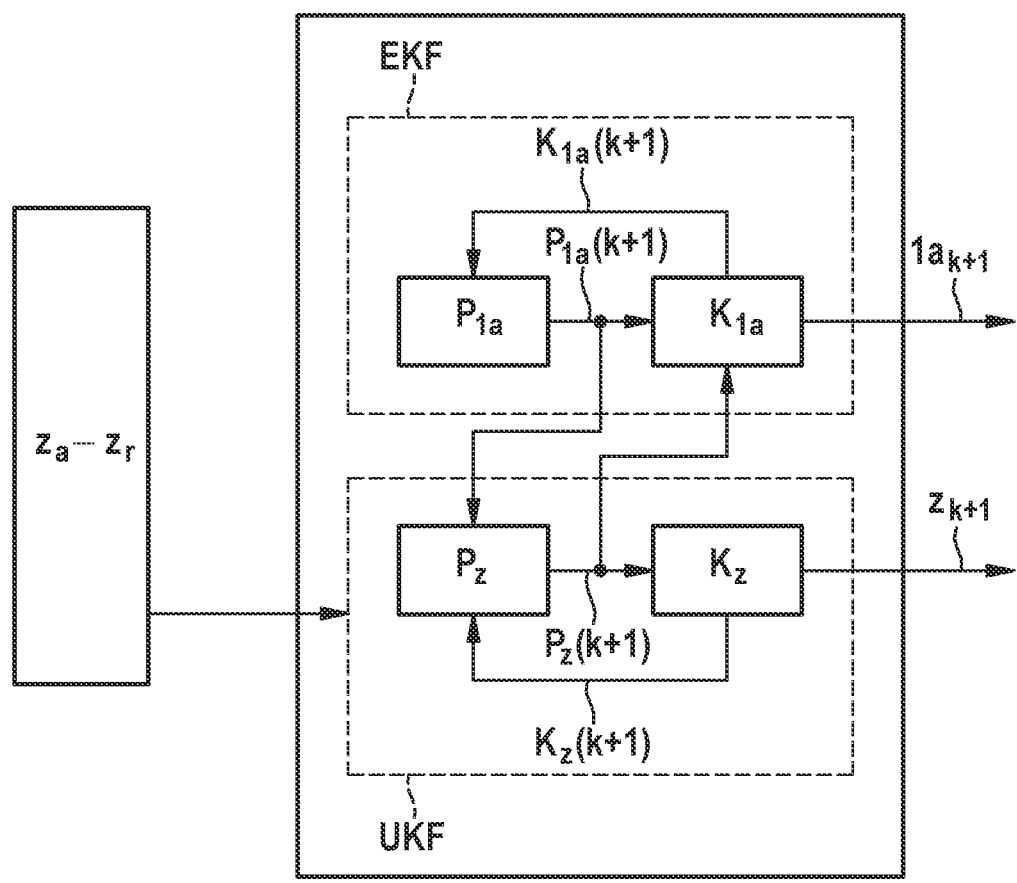
FIG. 3 shows a combination of an EKF for the estimation of parameters 1a and a UKF for the estimation of state z, according to an example embodiment of the present invention.

FIG. 3 illustrates a combination of an EKF for the estimation of parameters 1a and a UKF for the estimation of state z. Sensor data $z_a-z_r$ are only supplied to the UKF.

The UKF includes a predictor $P_z$, which outputs an estimation $P_z(k+1)$ of state z for point in time k+1 on the basis of the temporally previous pieces of information. The UKF additionally includes a corrector $K_z$, which corrects this information $P_z(k+1)$ on the basis of the most updated pieces of information and outputs final result $z_{k+1}$ for state z at point in time k+1.

Similarly, the EKF includes a predictor $P_{1a}$, which outputs an estimation $P_{1a}(k+1)$ of parameters 1a for point in time k+1 on the basis of the temporally previous pieces of information. The EKF additionally includes a corrector $K_{1a}$, which corrects this estimation $P_{1a}(k+1)$ on the basis of the most updated pieces of information and outputs final result $1a_{k+1}$ for parameters 1a at point in time k+1.

The main difference between the EKF and the UKF is that the EKF is primarily directed to a linearization of the observed behavior by Taylor development, while the UKF selects multiple sigma points and brings together the results obtained by processing of these sigma points with the nonlinear function to be observed.

Both in the UKF and in the EKF, correction $K_z(k+1)$ or $K_{1a}(k+1)$ supplied by corrector $K_z$ or $K_{1a}$ is fed back into associated predictor $P_z$ or $P_{1a}$. In addition, prediction $P_z(k+1)$ from the UKF is fed into corrector $K_{1a}$ of the EKF. Furthermore, prediction $P_{1a}(k+1)$ from the EKF is fed into the predictor $P_z$ of the UKF.

Figure 4A:
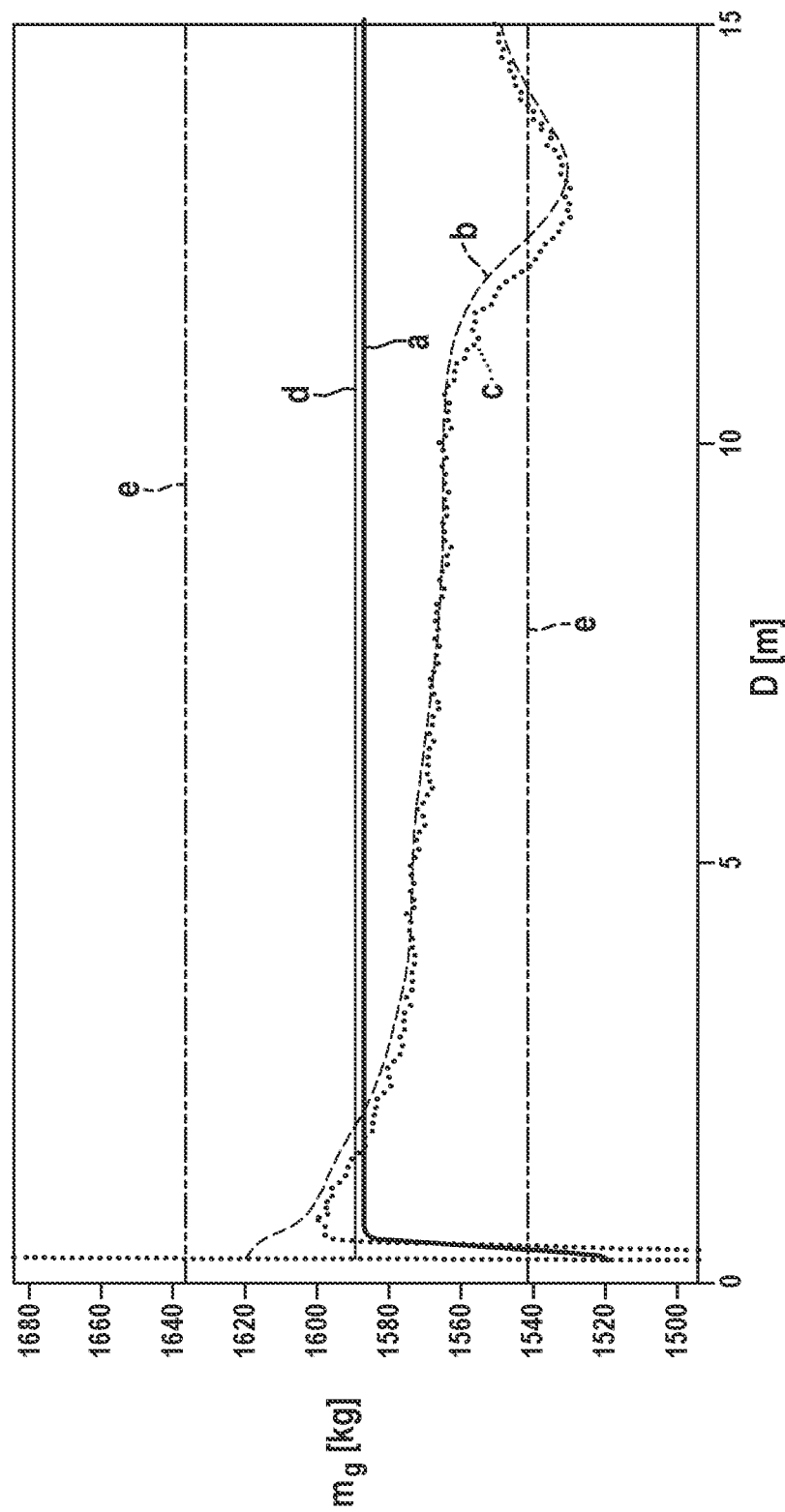
FIGS. 4A and 4B shows a comparison of various nonlinear observers in the simulation of a trip on a level route (FIG. 4A) and an uphill-downhill trip (FIG. 4B)

FIG. 4A shows a comparison of various nonlinear observers in the simulation of a trip on a level route. The vehicle initially accelerates from 0 km/h to 10 km/h, before it is braked again after 10 m. Estimated total mass $m_g$ of the vehicle is plotted over driving distance D. This total mass $m_g$ results from the known and constant empty mass of the vehicle (here 1519 kg) and particular estimated payload mass $m_{a,zu}$.

Actual total mass $m_g$, which is ideally to be ascertained using estimation of $m_{a,zu}$ supplied in each case by the observers, is represented by line d. Curve a indicates total mass $m_g$ according to the estimation of $m_{a,zu}$ supplied by the combination illustrated in FIG. 3 of an EKF and a UKF (DEUKF). Curve b indicates total mass $m_g$ according to the estimation of $m_{a,zu}$ ascertained only using an EKF. Curve c indicates total mass $m_g$ according to the estimation of $m_{a,zu}$ ascertained only using a Luenberger observer. Lines d show a corridor of 3% percent deviation from actual total mass $m_g$.

Figure 4B:
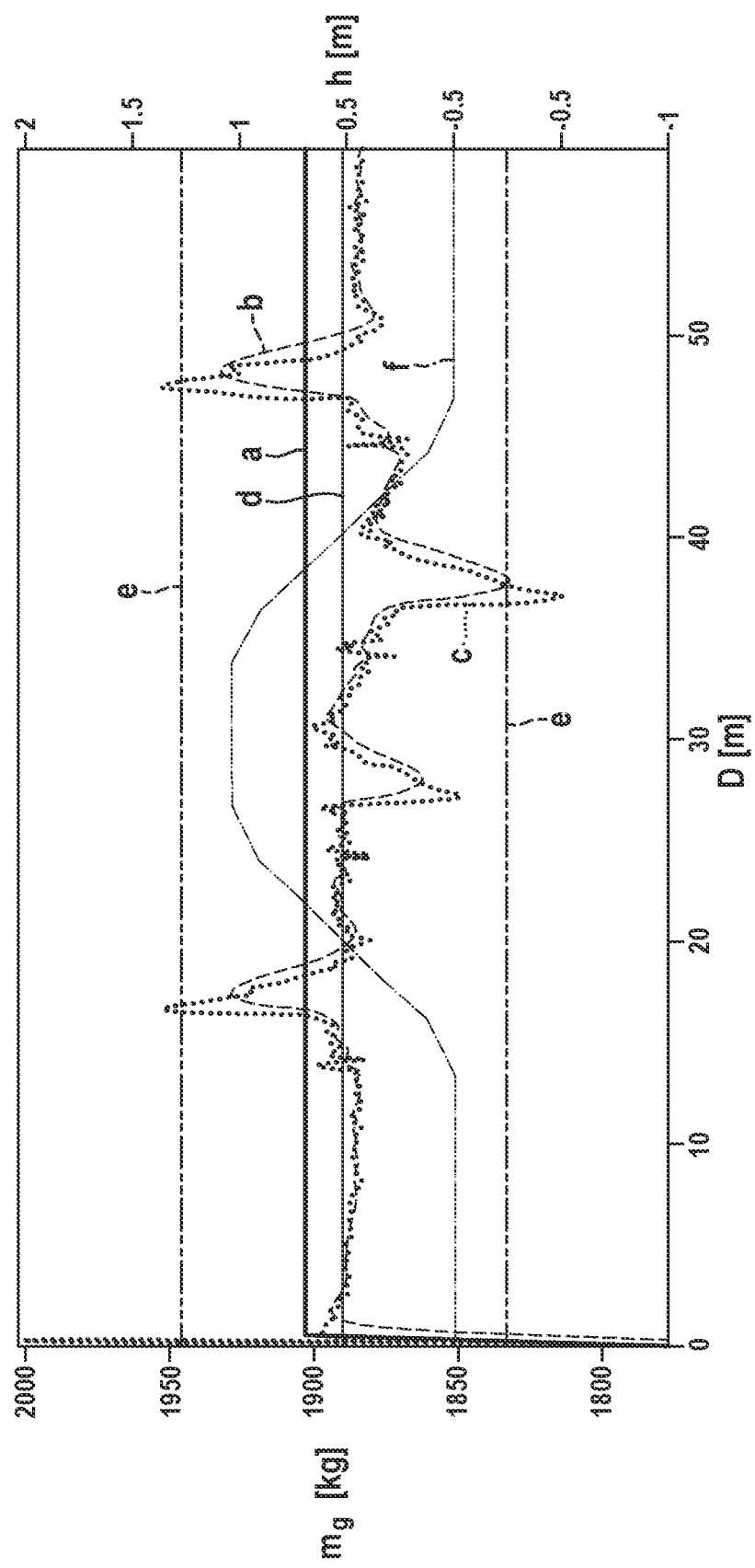

FIG. 4B shows a similar simulation for an uphill-downhill trip along the profile shown by curve f, for which the right scale of FIG. 4B shows particular height h.

Both during the trip on the level and also during the uphill-downhill trip, total mass $m_g$ ascertained according to the estimations ascertained using DEUKF converges very quickly to a final result which is close to actual total mass $m_g$. The estimations are thus also usable for very short trips, as occur, for example, during parking and unparking.

Figure 5B:
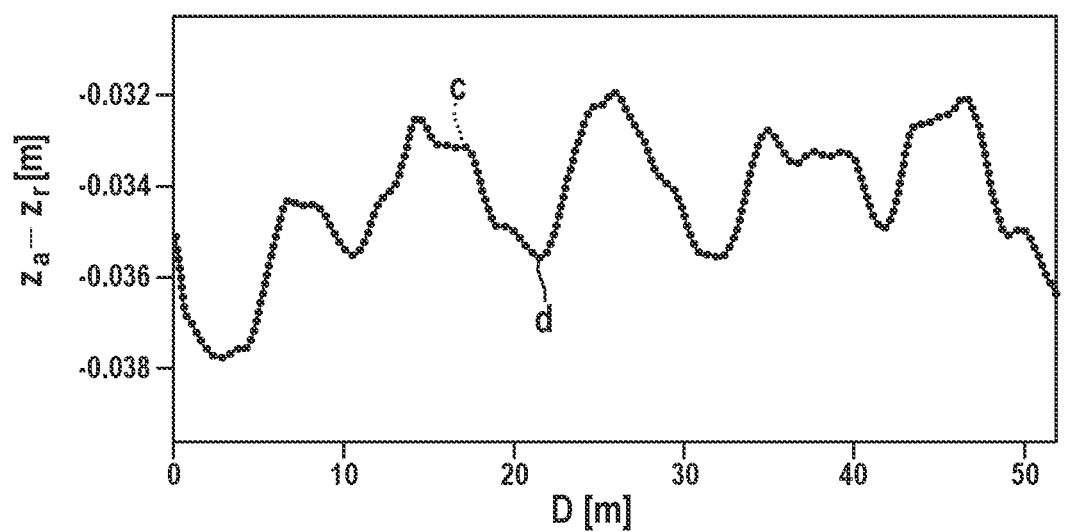
Figure 5C:
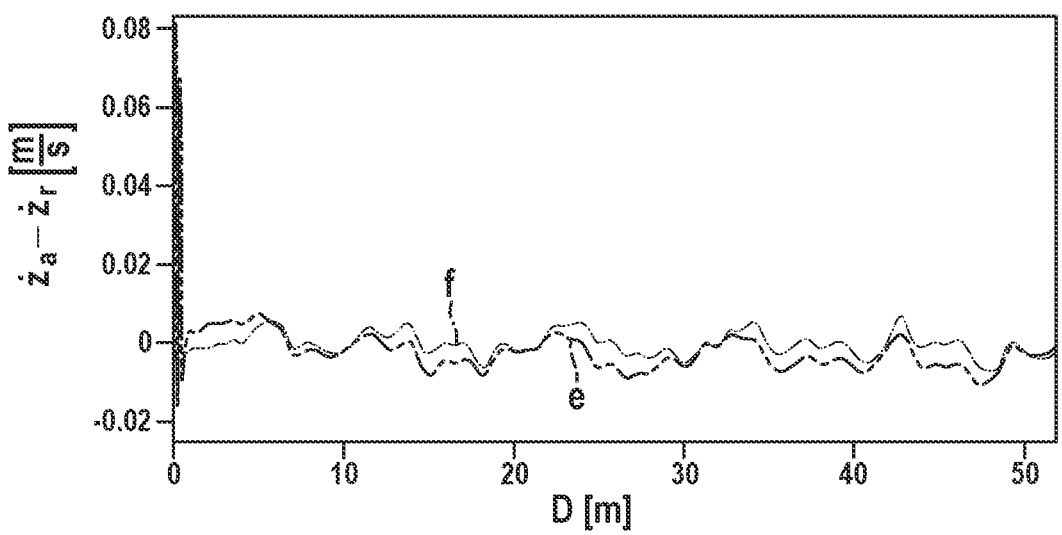

FIGS. 5A-5C show an observation of payload mass $m_{a,zu}$ (FIG. 5A) and state z (FIGS. 5B and 5C) from measured values $z_a-z_r$ of a real trip on a level route.

Line a in FIG. 5A shows actual payload mass $m_{a,zu}$. Curve b plots the estimation of this payload mass $m_{a,zu}$ using the DEUKF model illustrated in FIG. 3 over driving distance D.

Curve c in FIG. 5B shows vertical position $z_a-z_r$ taken from the observation of state z using the model. Curve d shows the measured values of the level sensor system, which are obviously reproduced very well by the observation.

Curve e in FIG. 5C shows time derivative $\dot{z}_a-\dot{z}_r$ of vertical position $z_a-z_r$ taken from the observation of state z using the DEUKF model. Curve f shows comparative values obtained by numeric differentiation of the measured values for time derivative $\dot{z}_a-\dot{z}_r$. At least qualitatively good correspondence with the observation is also shown here.

What is claimed is:

1. A method for determining a sought payload mass resting on a wheel of a vehicle, this vehicle having a level sensor system which is capable of detecting a vertical movement of a vehicle body in relation to the wheel, including the steps:
   detecting, using the level sensor system, in a time period in which the vehicle is moved, a time series of measured values, each of the measured values indicating a vertical position of the vehicle body in relation to the wheel;
   providing a model for a temporal development of the vertical position under influence of the gravitational force of the vehicle body and the payload, an elastic suspension between the vehicle body and the wheel of the vehicle, and a damping of the vertical relative movement between the vehicle body and the wheel of the vehicle, the model being parameterized at least using the sought payload mass, and the wheel of the vehicle and a connection of the wheel to a roadway being assumed to be rigid;
   ascertaining a payload mass which brings the model optimally into accordance with the time series of measured values as the sought payload mass; and
   providing a controller configured to control, based on the payload mass, at least one of:
   a vehicle dynamics of the vehicle,
   a braking force of the vehicle in a movement regulation for a longitudinal movement of the vehicle, or
   an acceleration force of the vehicle in the movement regulation for the longitudinal movement of the vehicle.

2. The method as recited in claim 1, wherein the model includes a balance of the forces acting on the vehicle body.

3. The method as recited in claim 1, wherein preparation of the model includes a discretization of the temporal development into time steps having step width $\Delta t$.

4. The method as recited in claim 3, wherein the ascertainment of the payload mass includes, preparing, based on the model and based on the temporal development of the vertical position between successive time steps, a system of differential equations in which the payload mass is an unknown.

5. The method as recited in claim 3, wherein a time derivative $\dot{z}$ of at least one state z in a time step k is approximated by differential quotients of a state change $z_{k+1}-z_k$ up to a time step k+1 and the step width $\Delta t$.

6. The method as recited in claim 1, wherein the model characterizes a state $z=[z_1,z_2]^T$ of the vehicle body by way of the vertical position $z_1=z_a-z_r$ and by way of its time derivative $z_2=\dot{z}_a-\dot{z}_r$.

7. The method as recited in claim 6, wherein the state z and parameters of the model are ascertained using at least one nonlinear observation algorithm.

8. The method as recited in claim 7, wherein the state z, or the parameters, are alternately predicted from temporally previous pieces of information and corrected based on more recent pieces of information using the nonlinear observation algorithm.

9. The method as recited in claim 8, wherein the correction of the parameters is carried out using a prediction of the state, and the prediction of the state is carried out using a prediction of the parameters.

10. The method as recited in claim 7, wherein the state z is ascertained using an Unscented Kalman Filter, and the parameters are ascertained using an Extended Kalman Filter.

11. The method as recited in claim 1, wherein:
   the model is adapted to the time series of the measured values by varying the parameters of the model; and
   the payload mass is ascertained from those parameters for which the model is consistent with the time series of the measured values.

12. A non-transitory machine-readable data medium on which is stored a computer program for determining a sought payload mass resting on a wheel of a vehicle, the vehicle having a level sensor system which is capable of detecting a vertical movement of a vehicle body in relation to the wheel, the computer program, when executed by one or multiple computers, causing the one or multiple computers to perform the steps:
   detecting, using the level sensor system, in a time period in which the vehicle is moved, a time series of measured values, each of the measured values indicating a vertical position of the vehicle body in relation to the wheel;

providing a model for a temporal development of the vertical position under influence of the gravitational force of the vehicle body and the payload, an elastic suspension between the vehicle body and the wheel of the vehicle, and a damping of the vertical relative movement between the vehicle body and the wheel of the vehicle, the model being parameterized at least using the sought payload mass, and the wheel of the vehicle and a connection of the wheel to a roadway being assumed to be rigid;

ascertaining a payload mass which brings the model optimally into accordance with the time series of measured values as the sought payload mass, wherein a controller is configured to control, based on the payload mass, at least one of:

a vehicle dynamics of the vehicle, a braking force of the vehicle in a movement regulation for a longitudinal movement of the vehicle, or an acceleration force of the vehicle in the movement regulation for the longitudinal movement of the vehicle.

13. One or multiple computers configured to determine a sought payload mass resting on a wheel of a vehicle, this vehicle having a level sensor system which is capable of detecting a vertical movement of a vehicle body in relation to the wheel, the one or multiple computers configured to:

detect, using the level sensor system, in a time period in which the vehicle is moved, a time series of measured values, each of the measured values indicating a vertical position of the vehicle body in relation to the wheel;

provide a model for a temporal development of the vertical position under influence of the gravitational force of the vehicle body and the payload, an elastic suspension between the vehicle body and the wheel of the vehicle, and a damping of the vertical relative movement between the vehicle body and the wheel of the vehicle, the model being parameterized at least using the sought payload mass, and the wheel of the vehicle and a connection of the wheel to a roadway being assumed to be rigid;

ascertain a payload mass which brings the model optimally into accordance with the time series of measured values as the sought payload mass, wherein a controller is configured to control, based on the payload mass, at least one of:

a vehicle dynamics of the vehicle, a braking force of the vehicle in a movement regulation for a longitudinal movement of the vehicle, or an acceleration force of the vehicle in the movement regulation for the longitudinal movement of the vehicle.

* * * * *